US012692399B2

(12) United States Patent (10) Patent No.: US 12,692,399 B2

Gong et al. (45) Date of Patent: Jul. 28, 2026

(54) PAVEMENT COATING MATERIAL AND PREPARATION METHOD THEREOF

(71) Applicant: Changsha University of Science and Technology, Hunan (CN)

(72) Inventors: Xiangbing Gong, Hunan (CN); Guoping Qian, Hunan (CN); Xue Huang, Hunan (CN); Heqi Zheng, Hunan (CN); Peng Huang, Hunan (CN); Jian Ouyang, Hunan (CN); Han Yan, Hunan (CN); Dawei Li, Hunan (CN); Hongwu Yin, Hunan (CN); Zhi Zhang, Hunan (CN)

(73) Assignee: Changsha University of Science and Technology, Hunan (CN)

( * ) Notice: Subject to any disclaimer, the term of this patent is extended or adjusted under 35 U.S.C. 154(b) by 554 days.

(21) Appl. No.: 18/241,878

(22) Filed: Sep. 3, 2023

(65) Prior Publication Data

US 2024/0191083 A1 Jun. 13, 2024

(30) Foreign Application Priority Data

Dec. 13, 2022 (CN) .......................... 202211592951.3

(51) Int. Cl.
| | |
|---|---|
| *C09D 5/00* | (2006.01) |
| *C09D 5/02* | (2006.01) |
| *C09D 7/61* | (2018.01) |
| *C09D 133/08* | (2006.01) |

(52) U.S. Cl.
CPC ............. *C09D 5/022* (2013.01); *C09D 5/027* (2013.01); *C09D 5/028* (2013.01); *C09D 7/61* (2018.01); *C09D 133/08* (2013.01)

(58) Field of Classification Search
CPC .......... C09D 5/022; C09D 7/61; C09D 5/027; C09D 5/028; C09D 133/08
USPC ..................................................... 106/287.24
See application file for complete search history.

(56) References Cited

FOREIGN PATENT DOCUMENTS

| | | | | |
|---|---|---|---|---|
| CN | 109810597 A | * | 5/2019 | |
| JP | 2002513820 A | * | 5/2002 | .............. E01F 9/506 |

* cited by examiner

*Primary Examiner* — James E Mcdonough
(74) *Attorney, Agent, or Firm* — CM Law LLP; Robert C. Klinger

(57) ABSTRACT

Provided are a pavement coating material and a preparation method thereof. The method for preparing a pavement coating material, includes: S1, adding a film-forming aid to a pure acrylic emulsion and mixing, to obtain an organic material; S2, adding a silane coupling agent to a silica sol and mixing, to obtain an inorganic material; S3, adding a part of a dispersant and a nano-catalyst to deionized water and mixing, to obtain a catalyst aqueous solution; and S4, mixing the organic material and the inorganic material by stirring to obtain a mixed base material, adding the catalyst aqueous solution, a hollow microbead, titanium dioxide, and carbon black sequentially to the mixed base material and mixing, to obtain a mixture, and adding a remaining part of the dispersant and a defoamer to the mixture and mixing, to obtain the pavement coating material.

13 Claims, No Drawings

PAVEMENT COATING MATERIAL AND PREPARATION METHOD THEREOF

CROSS REFERENCE TO RELATED APPLICATION

This patent application claims the benefit and priority of Chinese Patent Application No. 2022115929513, entitled "PAVEMENT COATING MATERIAL AND PREPARATION METHOD THEREOF", filed with the China National Intellectual Property Administration on Dec. 13, 2022, the disclosure of which is incorporated by reference herein in its entirety as part of the present application.

TECHNICAL FIELD

The present disclosure relates to the technical field of environmentally-friendly materials, and in particular to a pavement coating material and a preparation method thereof.

BACKGROUND

With the rapid development of transportation industry, the potential hazards of vehicle exhaust, near-surface high temperature, and driving safety have become increasingly prominent during the construction and operation of road transportation facilities. These problems can be summarized as two major aspects: rutting defects caused by the near-surface high temperature and pollution of automobile exhaust gas. On one hand, as a temperature-sensitive material, asphalt has a high absorption rate of solar heat radiation energy, which can easily cause excessively high pavement temperatures in summer. This leads to deformation under the action of repeated vehicle dynamic loads, resulting in rutting, upheaval, waves and other defects. On the other hand, with a surge in the number of vehicles, exhaust gas has become one of the main pollution sources. For example, factors such as various types of vehicles, uneven quality of vehicles, and poor quality of oil products lead to serious pollution of automobile exhaust gas in China. Moreover, since buildings around the road are densely distributed, the concentration of exhaust gas can be several times higher than that in developed countries. In view of the necessity and urgency of building a green transportation system proposed at the national level, there are currently many measures to solve the two major-aspect problem. However, these measures can generally only solve one-aspect problem, have a single function, and lack of combined application.

SUMMARY

In view of the above-mentioned shortcomings of the prior art, the present disclosure provides a pavement coating material and a preparation method thereof, wherein the pavement coating material is prepared from a photocatalytic material and a material with a relatively high reflectivity. On one hand, the coating material has a cooling effect, and once applied onto the pavement surface can effectively improve the problem of excessively high temperature of the pavement, thereby avoiding rutting and other defects on the pavement. On the other hand, the coating material further has a function of degrading exhaust gas, and is conducive to reducing a concentration of exhaust gas emitted by automobiles, thereby relieving the pollution of automobile exhaust gas. In addition, the method for preparing the pavement coating material has advantages of simple operations and low cost, and can easily achieve mass production. Moreover, the pavement coating material prepared shows desirable wear resistance, weather resistance, and plasticity, and has broad application prospects.

In order to achieve the above objects and other related objects, the present disclosure provides a method for preparing a pavement coating material, including the following steps:

S1: adding a film-forming aid to a pure acrylic emulsion and mixing, to obtain an organic material;

S2: adding a silane coupling agent to a silica sol and mixing, to obtain an inorganic material;

S3: adding a part of a dispersant and a nano-catalyst to deionized water and mixing, to obtain a catalyst aqueous solution; and S4: mixing the organic material and the inorganic material by stirring to obtain a mixed base material, adding the catalyst aqueous solution, a hollow microbead, titanium dioxide, and carbon black sequentially to the mixed base material and mixing, to obtain a mixture, and adding a remaining part of the dispersant and a defoamer to the mixture and mixing, to obtain the pavement coating material.

In some embodiments, the pure acrylic emulsion is in an amount of 80 parts to 120 parts, the silica sol is in an amount of 120 parts to 180 parts, and the deionized water is in an amount of 80 parts to 120 parts, each in parts by weight.

In some embodiments, in step S1, a mass ratio of the film-forming aid to the pure acrylic emulsion is in a range of 0.8:100 to 1.2:100.

In some embodiments, in step S2, a mass ratio of the silane coupling agent to the silica sol is in a range of 4:100 to 6:100.

In some embodiments, in step S3, a mass ratio of the part of the dispersant, the nano-catalyst, and the deionized water is in a range of (0.4-0.6):(2-4):100.

In some embodiments, in step S4, a ratio of a volume of the titanium dioxide to a sum of volumes of the titanium dioxide and the mixed base material is in a range of (14-16):100; a mass ratio of the hollow microbead to the mixed base material is in a range of (12-18):100; a mass ratio of the carbon black to the mixed base material is in a range of (0.4-0.8):100; a mass ratio of the remaining part of the dispersant to the mixed base material is in a range of (0.8-1.2):100; and a mass ratio of the defoamer to the mixed base material is in a range of (0.2-0.4):100.

In some embodiments, in step S1, the pure acrylic emulsion and the film-forming aid are mixed by stirring with a booster electric stirrer at 600 rpm for 8 min to 12 min.

In some embodiments, in step S2, the silica sol and the silane coupling agent are mixed by stirring with a booster electric stirrer at 600 rpm for 25 min to 35 min.

In some embodiments, in step S3, the deionized water, the dispersant, and the nano-catalyst are mixed by a process including S31: conducting shear mixing at a shear rate of 0 rpm to 12,000 rpm for 18 min to 22 min; and S32: conducting an ultrasonic treatment at 60° C. for 18 min to 22 min under an ultrasonic frequency of 28 KHz.

In some embodiments, in step S4, the organic material and the inorganic material are mixed by stirring with a booster electric stirrer at 600 rpm for 8 min to 12 min.

In some embodiments, in step S4, the mixed base material, the catalyst aqueous solution, the hollow microbead, the titanium dioxide, and the carbon black are mixed by stirring with a booster electric stirrer at 600 rpm for 35 min to 45 min.

In some embodiments, in step S4, the mixture, the remaining part of the dispersant, and the defoamer are mixed by stirring with a booster electric stirrer at 600 rpm for 15 min to 25 min.

The present disclosure further provides a pavement coating material prepared by the method for preparing a pavement coating material as described in above technical solutions.

The pavement coating material and the preparation method thereof according to the present disclosure at least have the following beneficial effects:

In the method for preparing a pavement coating material according to the present disclosure, a photocatalytic material and a material with a relatively high reflectivity are used to prepare a pavement coating material. On one hand, the coating material has a cooling effect, and once applied onto the pavement surface can effectively improve the problem of excessively high temperature of the pavement, thereby avoiding rutting and other defects on the pavement. On the other hand, the coating material further has a function of degrading exhaust gas, and is conducive to reducing a concentration of exhaust gas emitted by automobiles, thereby relieving the pollution of automobile exhaust gas. In addition, the method for preparing the pavement coating material has advantages of simple operations and low cost, and can easily achieve mass production. Moreover, the pavement coating material prepared shows desirable wear resistance, weather resistance, and plasticity, and has broad application prospects.

DETAILED DESCRIPTION OF THE EMBODIMENTS

The embodiments of the present disclosure are described below through specific examples, and those skilled in the art can easily understand other advantages and effects of the present disclosure from the contents disclosed in this specification. The present disclosure can also be implemented or applied through other different specific embodiments. Based on different viewpoints and applications, various modifications or amendments can be made to various details of this specification without departing from the spirit of the present disclosure.

It should be noted that the examples merely illustrate the basic concepts of the present disclosure schematically. Therefore, the examples only show components related to the present disclosure rather than the quantities, shapes, and sizes of components in actual embodiments, patterns, quantities, positions, and proportions of components in actual embodiments may be changed randomly, and the component layout may be more complicated.

Example 1

In this example, a pavement coating material was prepared according to the following procedures:

S1: A film-forming aid was added to 100 parts of a pure acrylic emulsion (a mass ratio of the film-forming aid to the pure acrylic emulsion being 1:100), and they were mixed to be uniform by stirring for 10 min, obtaining an organic material for later use.

S2: A silane coupling agent was added to 150 parts of a silica sol (a mass ratio of the silane coupling agent to the silica sol being 5:100), and they were mixed to be uniform by stirring for 30 min, obtaining an inorganic material for later use.

S3: A part of a dispersant and a nano-catalyst were added to 100 parts of deionized water (a mass ratio of the part of the dispersant, the nano-catalyst, and the deionized water being 0.5:3:100), and they were subjected to shear mixing at a shear rate of 0 rpm to 12,000 rpm for 20 min and then to an ultrasonic treatment at 60° C. under an ultrasonic frequency of 28 KHz for 20 min, to be mixed to be uniform, obtaining a catalyst aqueous solution for later use.

S4: The organic material prepared in step S1 and the inorganic material prepared in step S2 were mixed by stirring for 10 min, obtaining a mixed base material; the catalyst aqueous solution prepared in step S3, 15% of a hollow microbead, titanium dioxide with a volume concentration of 15%, and 0.6% of carbon black were added to the mixed base material sequentially, and they were mixed to be uniform by stirring for 40 min, obtaining a mixture; and 1% of a remaining part of the dispersant and 0.3% of a defoamer were added to the mixture, and they were mixed to be uniform by stirring for 10 min, obtaining the pavement coating material.

As an example, the silane coupling agent used was KH-570, the dispersant used was SN-5040, the defoamer used was NXZ defoamer, and the silica sol used had a particle size of 75 nm.

As an example, the stirring was conducted by using a booster electric stirrer at 600 rpm.

It should be noted that parts of the above raw materials were in parts by weight. A volume concentration of the titanium dioxide referred to a percentage of a volume of the titanium dioxide to a sum of a volume of the titanium dioxide and a volume of the mixed base material. That is to say, a ratio of a volume of the titanium dioxide to a sum of volumes of the titanium dioxide and the mixed base material was 15%. The percentages of the carbon black, the hollow microbead, the defoamer, and the remaining part of the dispersant respectively referred to a percentage of their each mass accounting for a mass of the mixed base material. That is to say, the hollow microbead accounted for 15% of the mass of the mixed base material, the carbon black accounted for 0.6% of the mass of the mixed base material, the remaining part of the dispersant accounted for 1% of the mass of the mixed base material, and the defoamer accounted for 0.3% of the mass of the mixed base material.

Example 2

In this example, a pavement coating material was prepared according to the following procedures:

S1: A film-forming aid was added to 80 parts of a pure acrylic emulsion (a mass ratio of the film-forming aid to the pure acrylic emulsion being 0.8:100), and they were mixed to be uniform by stirring for 8 min, obtaining an organic material for later use.

S2: A silane coupling agent was added to 120 parts of a silica sol (a mass ratio of the silane coupling agent to the silica sol being 4:100), and they were mixed to be uniform by stirring for 25 min, obtaining an inorganic material for later use.

S3: A part of a dispersant and a nano-catalyst were added to 80 parts of deionized water (a mass ratio of the dispersant, the nano-catalyst, and the deionized water being 0.4:2:100), and they were subjected to shear mixing at a shear rate of 0 rpm to 12,000 rpm for 18 min and then to an ultrasonic treatment at 60° C. under an ultrasonic frequency of 28 KHz for 18 min, to be mixed to be uniform, obtaining a catalyst aqueous solution for later use.

S4: The organic material prepared in step S1 and the inorganic material prepared in step S2 were mixed to be uniform by stirring for 8 min, obtaining a mixed base material; the catalyst aqueous solution prepared in step S3, 12% of hollow microbead, titanium dioxide with a volume concentration of 14%, and 0.4% of carbon black were added to the mixed base material sequentially, and they were mixed to be uniform by stirring for 35 min, obtaining a mixture; and 0.8% of a remaining part of the dispersant and 0.2% of a defoamer were added to the mixture, and they were mixed to be uniform by stirring for 15 min, obtaining the pavement coating material.

As an example, the silane coupling agent used was KH-570, the dispersant used were SN-5040, the defoamer used was NXZ defoamer, and the silica sol used had a particle size of 70 nm.

As an example, the stirring was conducted by using a booster electric stirrer at 600 rpm.

It should be noted that parts of the above raw materials were in parts by weight. A volume concentration of the titanium dioxide referred to a percentage of a volume of the titanium dioxide to a sum of a volume of the titanium dioxide and a volume of the mixed base material. That is to say, a ratio of a volume of titanium dioxide to a sum of volumes of the titanium dioxide and the mixed base material was 14%. The percentages of the carbon black, the hollow microbead, the defoamer, and the remaining part of the dispersant respectively referred to a percentage of their each mass accounting for a mass of the mixed base material. That is to say, the hollow microbead accounted for 12% of the mass of the mixed base material, the carbon black accounted for 0.4% of the mass of the mixed base material, the dispersant accounted for 0.8% of the mass of the mixed base material, and the defoamer accounted for 0.2% of the mass of the mixed base material.

Example 3

In this example, a pavement coating material was prepared according to the following procedures:

S1: A film-forming aid was added to 120 parts of a pure acrylic emulsion (a mass ratio of the film-forming aid to the pure acrylic emulsion being 1.2:100), and they were mixed to be uniform by stirring for 12 min, obtaining an organic material for later use.

S2: A silane coupling agent was added to 180 parts of a silica sol (a mass ratio of the silane coupling agent to the silica sol being 6:100), and they were mixed to be uniform by stirring for 35 min, obtaining an inorganic material for later use.

S3: A part of a dispersant and a nano-catalyst were added to 120 parts of deionized water (a mass ratio of the part of the dispersant, the nano-catalyst, and the deionized water being 0.6:4:100), and they were subjected to shear mixing at a shear rate of 0 rpm to 12,000 rpm for 22 min and then to an ultrasonic treatment at 60° C. under an ultrasonic frequency of 28 KHz for 22 min, to be mixed to be uniform, obtaining a catalyst aqueous solution for later use.

S4: The organic material prepared in step S1 and the inorganic material prepared in step S2 were mixed to be uniform by stirring for 12 min, obtaining a mixed base material; the catalyst aqueous solution prepared in step S3, 18% of hollow microbead, titanium dioxide with a volume concentration of 16%, and 0.8% of carbon black were added to the mixed base material sequentially, and they were mixed to be uniform by stirring for 45 min, obtaining a mixture; and 1.2% of a remaining part of the dispersant and 0.4% of a defoamer were added to the mixture, and they were mixed to be uniform by stirring for 25 min, obtaining the pavement coating material.

As an example, the silane coupling agent used was KH-570, the dispersant used was SN-5040, the defoamer used was an NXZ defoamer, and the silica sol used had a particle size of 85 nm.

As an example, the stirring was conducted by using a booster electric stirrer at 600 rpm.

It should be noted that parts of the above raw materials were in parts by weight. A volume concentration of the titanium dioxide referred to a percentage of a volume of the titanium dioxide to a sum of the volume of the titanium dioxide and a volume of the mixed base material. That is to say, a ratio of a volume of the titanium dioxide to a sum of volumes of the titanium dioxide and the mixed base material was 16%. The percentages of the carbon black, the hollow microbead, the defoamer, and the remaining part of the dispersant respectively referred to a percentage of their each mass accounting for a mass of the mixed base material. That is to say, the hollow microbead accounted for 18% of the mass of the mixed base material, the carbon black accounted for 0.8% of the mass of the mixed base material, the remaining part of the dispersant accounted for 1.2% of the mass of the mixed base material, and the defoamer accounted for 0.4% of the mass of the mixed base material.

Comparative Example 1

In this comparative example, a pavement coating material was prepared according to the following procedures:

S1: Titanium dioxide, an inorganic color pigment, and a hollow microbead were mixed to be uniform, and 100 parts of an epoxy resin was added thereto, and they were stirred thoroughly for 10 min, obtaining a color slurry, wherein a mass ratio of the titanium dioxide, the inorganic color pigment, the hollow microbead, and the epoxy resin was 15:30:20:100.

S2: 1% of a dispersant, 0.4% of a defoamer, and carbon black were added in sequence to the color slurry prepared in step S1, and they were stirred for 30 min, obtaining a semi-finished product, wherein a mass ratio of the carbon black to the titanium dioxide being 40%.

S3: A diluent and a curing agent were added to the semi-finished product prepared in step S2, and they were fully stirred for 20 min, and cured to form a coating material, wherein a mass ratio of the diluent to the epoxy resin was 15:100, and a mass ratio of the curing agent to the epoxy resin was 25:100.

As an example, the dispersant used was SN-5040, the defoamer used was NXZ defoamer, the curing agent used was AK-260, and the diluent used was X-502.

It should be noted that parts of the above raw materials were in parts by weight; the percentages of the dispersant and the defoamer respectively referred to a percentage of their each mass accounting for a total mass of the coating material.

Comparative Example 2

In this comparative example, no coating material was provided, and this comparative example was regarded as a blank control group.

The performance of the pavement coating materials prepared in the examples and comparative examples was measured according to the procedures below:

The pavement coating materials of Examples 1 to 3 or Comparative Examples 1 to 2 were separately applied to cover a surface of a rutting plate, and automobile exhaust gas treatment tests were conducted. Each coating material was painted onto the surface of the rutting plate in a coating amount of 0.6 kg/m² for test, in which adsorption and degradation of automobile exhaust gas were investigated. Adsorption-degradation rate=(initial concentration−concentration after 10 min)/initial concentration×100%. The test results are shown in Table 1.

TABLE 1

| Automobile exhaust gas treatment test results | | | | |
|---|---|---|---|---|
| | CO (vol %) | $CO_2$ (vol %) | HC (ppmvol) | NO (ppmvol) |
| Example 1 | 57 | 63 | 72 | 87 |
| Example 2 | 54 | 59 | 69 | 85 |
| Example 3 | 56 | 61 | 70 | 83 |
| Comparative Example 1 | 41 | 47 | 56 | 66 |
| Comparative Example 2 | 29 | 35 | 39 | 46 |

As shown in Table 1, Examples 1 to 3 show desirable adsorption and degradation effects on automobile exhaust gas, while Comparative Examples 1 and 2 show relatively poor adsorption effects on automobile exhaust gas.

The pavement coating materials of Examples 1 to 3 or Comparative Examples 1 to 2 were applied to cover the surface of the rutting plate to test and analyze the cooling performance. Each coating material was painted onto the surface of the rutting plate in a coating amount of 0.6 kg/m² for test, and temperature sensors were separately laid on the surface and interior of the rutting plate. At an ambient temperature of 45° C., an iodine-tungsten lamp was used to simulate sunlight, temperature changes were recorded by a paperless recorder, and the temperatures were compared after 2 h. The test results are shown in Table 2.

TABLE 2

| Cooling performance test results | | |
|---|---|---|
| | Surface temperature (° C.) | Interior temperature (° C.) |
| Example 1 | 36 | 28 |
| Example 2 | 38 | 31 |
| Example 3 | 37 | 30 |
| Comparative Example 1 | 42 | 36 |
| Comparative Example 2 | 55 | 47 |

As shown in Table 2, Examples 1 to 3 have a better reflection effect on the pavement, thereby showing a better cooling effect on the pavement, while Comparative Examples 1 to 2 have a relatively poor cooling effect.

The foregoing embodiments are merely intended to exemplarily explain the principles and effects of the present disclosure, rather than limit the present disclosure. Any person skilled in the art can make modifications or alterations to the foregoing embodiments without departing from the spirit and scope of the present disclosure. Hence, all equivalent modifications or changes made by those of ordinary skill in the art without departing from the spirit and technical teachings disclosed in the present disclosure should fall within the scope defined by appended claims to the present disclosure.

What is claimed is:

1. A method for preparing a pavement coating material, comprising the steps of

S1: adding a film-forming aid to a pure acrylic emulsion and mixing, to obtain an organic material;

S2: adding a silane coupling agent to a silica sol and mixing, to obtain an inorganic material;

S3: adding a part of a dispersant and a nano-catalyst to deionized water and mixing, to obtain a catalyst aqueous solution; and S4: mixing the organic material and the inorganic material by stirring to obtain a mixed base material, adding the catalyst aqueous solution, a hollow microbead, titanium dioxide, and carbon black sequentially to the mixed base material and mixing, to obtain a mixture, and adding a remaining part of the dispersant and a defoamer to the mixture and mixing, to obtain the pavement coating material.

2. The method as claimed in claim 1, wherein the pure acrylic emulsion is in an amount of 80 parts to 120 parts, the silica sol is in an amount of 120 parts to 180 parts, and the deionized water is in an amount of 80 parts to 120 parts, each in parts by weight.

3. The method as claimed in claim 2, wherein in step S1, a mass ratio of the film-forming aid to the pure acrylic emulsion is in a range of 0.8:100 to 1.2:100.

4. The method as claimed in claim 2, wherein in step S2, a mass ratio of the silane coupling agent to the silica sol is in a range of 4:100 to 6:100.

5. The method as claimed in claim 2, wherein in step S3, a mass ratio of the part of the dispersant, the nano-catalyst, and the deionized water is in a range of (0.4-0.6):(2-4):100.

6. The method as claimed in claim 1, wherein in step S4, a ratio of a volume of the titanium dioxide to a sum of volumes of the titanium dioxide and the mixed base material is in a range of (14-16):100; a mass ratio of the hollow microbead to the mixed base material is in a range of (12-18):100; a mass ratio of the carbon black to the mixed base material is in a range of (0.4-0.8):100; a mass ratio of the remaining part of the dispersant to the mixed base material is in a range of (0.8-1.2):100; and a mass ratio of the defoamer to the mixed base material is in a range of (0.2-0.4):100.

7. The method as claimed in claim 1, wherein in step S1, the pure acrylic emulsion and the film-forming aid are mixed by stirring with a booster electric stirrer at 600 rpm for 8 min to 12 min.

8. The method as claimed in claim 1, wherein in step S2, the silica sol and the silane coupling agent are mixed by stirring with a booster electric stirrer at 600 rpm for 25 min to 35 min.

9. The method as claimed in claim 1, wherein in step S3, the deionized water, the dispersant, and the nano-catalyst are mixed by a process comprising S31: conducting shear mixing at a shear rate of 0 rpm to 12,000 rpm for 18 min to 22 min; and S32: conducting an ultrasonic treatment at a temperature of 60° C. for 18 min to 22 min under an ultrasonic frequency of 28 KHz.

10. The method as claimed in claim 1, wherein in step S4, the organic material and the inorganic material are mixed by stirring with a booster electric stirrer at 600 rpm for 8 min to 12 min.

11. The method as claimed in claim 1, wherein in step S4, the mixed base material, the catalyst aqueous solution, the hollow microbead, the titanium dioxide, and the carbon black are mixed by stirring with a booster electric stirrer at 600 rpm for 35 min to 45 min.

12. The method as claimed in claim 1, wherein in step S4, the mixture, the remaining part of the dispersant, and the defoamer are mixed by stirring with a booster electric stirrer at 600 rpm for 15 min to 25 min.

13. A pavement coating material prepared by the method for preparing the pavement coating material as claimed in claim 1.

\* \* \* \* \*